Jan. 30, 1934.    E. L. FONSECA    1,945,109
AUTOMATIC FUEL CONTROL DEVICE
Filed April 5, 1929    2 Sheets-Sheet 2
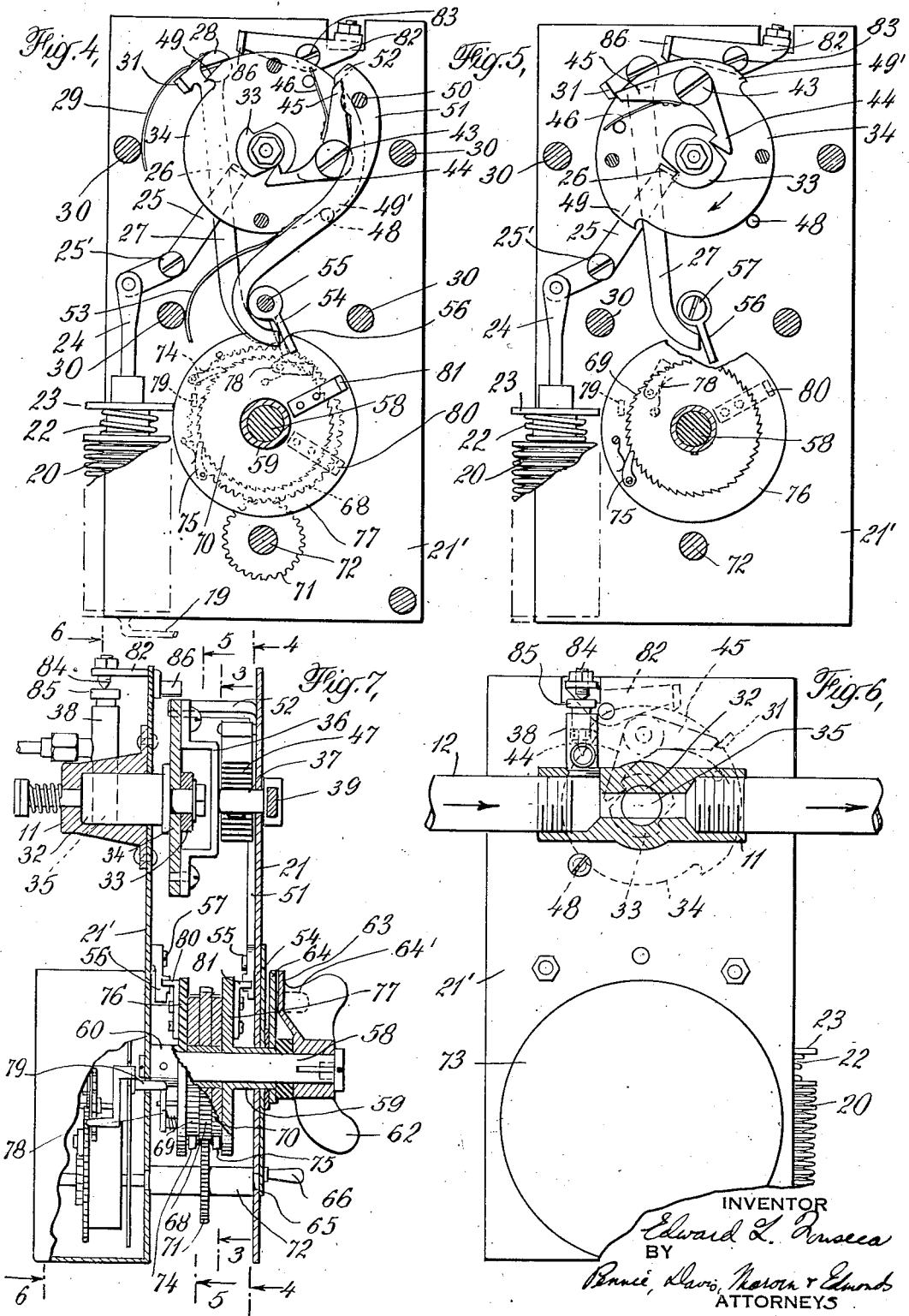
INVENTOR
Edward L. Fonseca
BY
Pennie, Davis, Marvin & Edmonds
ATTORNEYS Patented Jan. 30, 1934

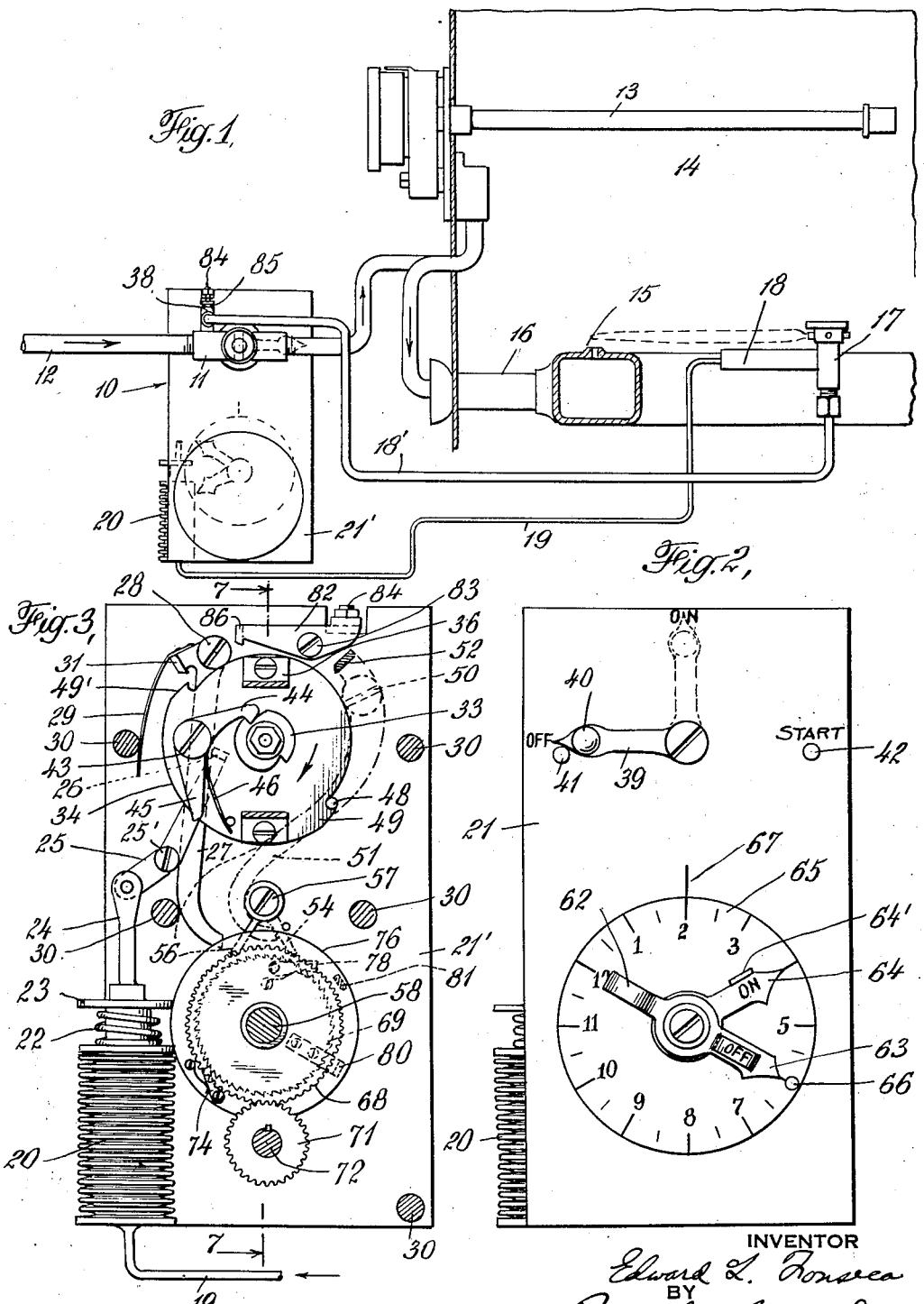

1,945,109

UNITED STATES PATENT OFFICE

1,945,109

AUTOMATIC FUEL CONTROL DEVICE

Edward L. Fonseca, Newark, N. J., assignor to The Wilcolator Company, Newark, N. J., a corporation of Delaware Application April 5, 1929. Serial No. 352,735

9 Claims. (Cl. 161—7)

This invention relates to an automatic apparatus for controlling the supply of fuel to burners, and has particular reference to apparatus for automatically turning on and shutting off at predetermined times the supply of gas to the burners of a gas cooking oven.

The principal object of this invention is to provide apparatus which automatically turns on the supply of gas to the burners at a predetermined future time, automatically lights the gas at that time, and, after a predetermined cooking time has elapsed, automatically turns off the supply of gas to extinguish the burners, without the intervention at any time of a human agency beyond the initial setting of the apparatus to operate at the intended future times in the manner described.

Another object of the invention is to provide apparatus of the character described in which a pilot flame for lighting the burners is under automatic and positive control when the apparatus is prepared by setting a single gas supply valve for future operation.

A further object of the invention is to provide apparatus of the character described in which a safety device prevents the operation of the apparatus to turn on the gas in the event that the pilot flame has become extinguished, whereby the dangerous emission and accumulation of gas fumes are prevented.

These and other objects of the invention are obtained in a preferred embodiment of the invention which comprises a double-acting escapement mechanism controlled by a clock, this escapement mechanism in turn controlling a single gas supply valve, which is turned on at the proper predetermined time by the release of a spring motor by the escapement, and then turned off at the predetermined later time by a second release of the spring motor by the escapement.

The pilot flame is lighted when the apparatus is prepared by the user and is automatically shut off by mechanism released by the escapement when the gas supply is automatically turned off after the cooking operation is completed.

A device which is expansible when exposed to the heat of the pilot flame unlocks the escapement mechanism for operation by the clock at the proper time when the pilot is lighted, in the manner described, but which locks the escapement mechanism when not expanded because of failure of the pilot flame, whereby the turning on of the gas supply is prevented.

Other features of the apparatus of this invention will become apparent upon examination of the preferred embodiment thereof illustrated in the accompanying drawings, in which Figure 1 illustrates a schematic arrangement including the automatic control apparatus of this invention as applied to a gas burning oven fitted with a thermostatic regulator, although this regulator is not a necessary adjunct to the new apparatus when applied to a gas oven;

Fig. 2 is an enlarged view of the front of the new control apparatus;

Fig. 3 is an enlarged vertical section of this apparatus as seen along the line 3—3 of Fig. 7, and showing the relation of the elements thereof when the gas is off before preparation for operation;

Fig. 4 is another enlarged vertical section of this apparatus as seen along the line 4—4 of Fig. 7, and showing the relation of the elements thereof when the apparatus has been prepared for operation, i. e., it is in the starting position;

Fig. 5 is another vertical section as seen along the line 5—5 of Fig. 7, and showing the relation of the elements when the gas has been turned on by the first operation of the escapement mechanism;

Fig. 6 is a partial vertical section taken along the line 6—6 of Fig. 7, and showing the gas supply and pilot valves; and Fig. 7 is a vertical cross-section through the apparatus as seen along the line 7—7 of Fig. 3, which shows the elements thereof in the "off" position.

In these drawings numeral 10 designates the control apparatus of this invention, whose single valve 11 is connected in a gas supply line 12 extending into oven 14 equipped with the burner 15 supplied by pipe 16 from the thermostat 13. The thermostat 13 may be of any suitable type for controlling the supply of gas to the burner 15 in accordance with the temperature of the oven 14. A particular type of thermostat which is suitable for this purpose is disclosed in my copending application Serial No. 322,110, filed November 27, 1928.

The burner 15 is adapted to be ignited by the flame of the pilot burner 17 supplied with gas by pipe 18' through the push valve 38 connected to gas supply pipe 12 and controlled in the manner to be subsequently described. Mounted upon the frame of pilot burner 17 is a capsule or bomb 18 filled with a gas having a high coefficient of expansion in response to heat, a liquid vaporizable by heat, or any other medium which is expansible when exposed to heat. This bomb 18 communicates by capillary tube 19 with a variable volume container 20, which preferably takes the form of a flexible metal bellows and which is freely expansible by the gas or other fluid contained therein when the bomb 18 is heated by the flame of pilot 17 and contractible when the pilot heat fails because of extinguishment of the flame or other reason.

As shown particularly in Fig. 3, the flexible bellows 20 is mounted securely at its base to the rear plate 21' of the control apparatus 10. The upper end of the bellows is free to move upon contraction and expansion of the gas therein, but is constrained against expansion by a coil spring 22 inserted between its upper surface and a bracket 23 secured to the rear plate 21'. Connected to the top of bellows 20 is a push rod 24, which is adapted to move with the expansion and contraction of bellows 20. This rod 24 is pivoted to a lever 25 fulcrumed upon rear plate 21' by pin or screw 25', and provided at its upper end with a detent 26, which engages and locks lever 27 against movement in the event that the bellows 20 is contracted, that is, when the pilot burner 17 is extinguished so that the bomb 18 is not heated and fails to increase the pressure of the gas in bellows 20, so that the latter is not expanded. However, when bellows 20 is expanded by the increased pressure therein, push rod 24 is raised to rotate lever 25 about its pivot 25', so that the detent 26 thereof is freed from lever 27, thus allowing the latter to be moved so that it may perform its intended function to be described later. Thus, a safety arrangement is provided which prevents operation of the control device whenever the pilot burner 17 is not lighted or has become extinguished.

Lever 27 is fitted with integral lateral dog 31 and is pivoted upon pin or screw 28 secured to the upper end of rear plate 21', and is constrained toward the right, as seen in Fig. 3 by means of a leaf spring 29 engaging a stud 30, which serves to secure the front plate 21 and the rear plate 21' together, along with a number of other studs 30 shown in Fig. 3.

The valve 11 is secured to the rear plate 21', the stem 32 thereof extending through rear plate 21' and carrying a ratchet 33 at its opposite end. A cam 34 is journalled upon valve stem 32 at a point behind front plate 21 and adjacent ratchet 33, as shown particularly in Fig. 7. The stem 32 of valve 11 is drilled so as to provide a gas passage 35 communicating with gas supply pipe 12 when turned so that the passage 35 is aligned axially with the axis of pipe 12, as shown in Fig. 6. Obviously, when valve stem 32 is turned at right angles to the position shown in Fig. 6, the supply of gas is turned off.

A diametral yoke 36 is mounted on the surface of cam 34 and carries a shaft 37 extending through and journalled in the front plate 21, as shown in Fig. 7. Secured to the projecting end of shaft 37 is a handle 39 having a knob 40 so that the handle may be turned through an angle of 180° between stop pins 41 and 42. The free end of handle 39 serves as a pointer for designating the three positions of the lever 39 as shown in Fig. 2, these positions, "start", "on", and "off", being inscribed on face plate 21 for the convenience of the user.

The cam 34 also carries a pivoted pawl 43, one end of which is shaped to form a hook 44 adapted to engage ratchet 33, and the other end of which serves as a detent 45, which is constrained outwardly by means of leaf spring 46. A spring motor 47 is connected to shaft 37 so as to constrain cam 34 in the "off" position shown in Fig. 2, whereby the passage 35 in valve stem 32 is disposed at right angles to gas supply pipe 12 so that no gas can flow therethrough. This "off" condition of the gas supply valve finds the elements arranged as shown in Figs. 2, 3 and 7. The spring motor 47 is continually wound up and is prevented from being unwound by a stop 48 on rear plate 21', which engages a tooth 49 on cam 34 as shown in Fig. 3.

Suspended upon a pin 50 on the rear surface of the front plate 21 is a second depending lever 51 fitted at its upper end with a dog 52 and constrained toward the right as seen in Fig. 4 by a leaf spring 53 engaging stud 30. Under certain conditions the lower or free end of lever 51 is adapted to be engaged by a pawl 54 pivoted upon a pin 55 secured on the rear surface of front plate 21 as shown in Fig. 4. Similarly, under certain conditions, the free end of depending lever 27 is adapted to be engaged by a pawl 56 pivoted to the inner surface of rear plate 21' upon pin 57.

Journalled in and extending between front plate 21 and rear plate 21' and toward the lower portion thereof is a shaft 58 upon which are mounted two sleeves 59 and 60, the former being freely journalled on and the latter being secured to shaft 58, as shown particularly in Fig. 7. The end of the shaft 58 which projects through front plate 21 carries a handle 62 fitted with a pointer 63 preferably inscribed with the word "off", as shown in Fig. 2. Similarly, the end of sleeve 59 which extends through front plate 21 is provided with a pointer 64 having an upturned lug 64' and inscribed with the word "on", as shown in Fig. 2. Disposed behind pointers 63 and 64 so as to lie upon front plate 21, and journalled upon sleeve 59, is a circular disc 65 inscribed with the hours of the day and rotatable by means of a knob 66, so that any graduation corresponding to any hour of the day may be placed opposite stationary index 67 inscribed upon the surface of front plate 21, as shown in Fig. 2.

Journalled upon shaft 58 is a gear wheel 68 carrying ratchet wheels 69 and 70. Gear wheel 68 is engaged by pinion 71 mounted upon shaft 72, which is driven by the clock mechanism 73 in the well known manner. Ratchet wheels 69 and 70 are engaged by pawls 74 and 75 respectively, which are mounted upon discs 76 and 77 respectively, which are secured upon sleeves 60 and 59, respectively. Pawls 74 and 75 are arranged to drive discs 76 and 77, respectively from clock-driven gear 68, to which their respective ratchet wheels 69 and 70 are secured. Pawls 74 and 75, however, do not prevent relative movement of their corresponding discs 76 and 77 when the former is rotated by manipulating handle 62, and the latter is rotated when handle 62 engages lug 64' on pointer 64. The clock 73 may be wound up in the usual way by rotating handle 62 in a clockwise direction, since the latter is connected to shaft 72, which in turn is connectable to gear 68 by the usual ratchet mechanism, not shown. The ratchet mechanisms 69—74 and 70—75 permit the handle 62 and pointer 64 to be rotated freely in a counterclockwise direction without winding the clock mechanism as is usual in clocks and watches. When handle 62 is operated in the opposite direction from the winding direction, i. e., counterclockwise, so that its pointer 63 is brought opposite stationary index 67, a pawl 78 on disc 76 trips a trigger 79, which releases a brake on the balance wheel or the like of the clock 73, so that the clock will run from that time onward. When both pointers 63 and 64 are moved around to coincide with the index 67 by the clock, and the valve mechanism is released in the manner described hereafter, the pawl 78 on disc 66 again actuates trigger 79 to cause it to engage the balance wheel and so stop the clock. This arrangement is provided so that the clock only runs when it is being used, whereby the clock does not run down when not in use and continual rewinding is not necessary.

Mounted on disc 76 is a lug 80, which is adapted to engage pawl 56 as the disc 76 is rotated by the clock mechanism in the manner described. Pawl 56 is adapted to engage and move the lower free end of pivoted lever 27 as pointed out above. A similar lug 81 is mounted upon disc 77 for engagement with pawl 54 when the clock mechanism rotates the disc to that position. As pointed out above, pawl 54 is adapted to engage and move the lower free end of pivoted lever 51.

A pilot burner valve 38 located behind rear plate 21' and mounted upon the body of main valve 11 is supplied with gas directly by the supply pipe 12 as shown in Fig. 1, and is operable by means of a lever 82, pivoted upon the front surface of rear plate 21' by means of a pin or screw 83, and provided with an adjustable stud 84 which engages the push button 85 of the valve to operate the same when the lever 82 is moved. The free end of lever 82 is provided with an integral dog 86 which is adapted to ride upon the edge of cam 34 so as to be raised thereby to supply gas to the pilot burner 17 when cam 34 is turned by handle 39 to the starting position, this action being shown in Figs. 5 and 6.

Before being prepared for operation by the user, the elements of the apparatus are arranged as shown in Figs. 2, 3 and 7. In order to prepare the apparatus for operation, the user turns the handle 62 in a clockwise direction to rotate pointer 63, which in turn engages lug 64' of pointer 64 and rotates the same, until both of these pointers lie in coincidence opposite stationary index 67 on face plate 21. This causes pawl 78 upon disc 80, which is driven by handle 62, to trip trigger 79 so as to release the clock brake and start the clock 73 into operation. Then the user rotates the disc 65 by means of knob 66 until the graduation corresponding to the exact present time of the day is placed opposite stationary index 67 on face plate 21. For example, assume that it is then two o'clock in the afternoon, the user turns disc 65 into the position shown in Fig. 2. Suppose that the user desires a cooking, baking or other operation to continue for, say, two hours, so that food in the oven will be ready at six o'clock. The user then turns the "on" pointer 64 to four o'clock, at which time the gas will be automatically turned on and the burner will be automatically lighted, and then turns "off" pointer 63 to six o'clock, at which time the pilot burner 17 and main burner 15 will be automatically extinguished. These adjustments place lug 81 of disc 67, which corresponds to "on" pointer 64, and lug 80 of disc 76, which corresponds to "off" pointer 63, in the positions shown in Fig. 4.

Then the user turns handle 39 from the position shown in Fig. 2 through an angle of 180°, to "start" position against stop 42, where the handle is locked by the engagement of detent 45 on cam 34 with dog 52 on lever 51, as shown in Fig. 4. At the same time, hook 44 on lever 43 engages a notch in ratchet 33, which is secured to the stem 32 of main valve 11. It will be seen, however, that this action does not rotate valve stem 32 so that the valve is not opened when the device is prepared for operation, i. e., set to starting position. Also, as shown in Fig. 4, the edge of cam 34 raises dog 86 to rotate lever 82 about its pivot 83 and operate pilot valve 85. If pilot burner 17 is of the type which has a continuously burning small flame, this flame is lengthened as shown in Fig. 1 by the resultant increased supply of gas, but if the pilot burner 17 is normally extinguished, the gas issuing therefrom upon the automatic operation of valve 85, in the manner described, must be lighted at this time. The user may then leave the stove because the control thereafter will be fully automatic.

Within a few minutes, say two or three minutes, the gas or other expansible fluid in bomb 18 has been heated sufficiently by the pilot flame to expand bellows 20 against spring 22, so that push rod 24 moves upwardly to rotate lever 25 about its pivot 25', and thus release detent 26 from lever 27, which is then swung toward the right from the position shown in Fig. 3 to the position shown in Fig. 4, so that its dog 31 lies in the path of detent 45 when this detent is rotated after being released by dog 52 in the manner to be subsequently described.

Both pointers 63 and 64 are driven in a counterclockwise direction, as seen in Fig. 2, by the clock mechanism 73, through the connections including gears 68 and 71, ratchet wheels 69 and 70, and respective pawls 74 and 75 on respective discs 76 and 77, which are respectively connected to shaft 58 and sleeve 59, which carry pointers 64 and 63, respectively. These pointers obviously move at the same rate, and when "on" pointer 64 moves opposite the stationary index 67, the lug 81 thereof engages pivoted pawl 54 to move the same against the free end of lever 51, whereby the latter is swung to draw its dog 52 out of contact with detent 45, so that the latter is unlatched. The unlatching of detent 45 by dog 52 allows spring motor 47 to rotate cam 34 to the position shown in Fig. 5, where detent 45 engages dog 31 of the second lever 27. Because hook 44 has been in engagement with ratchet 33, this ratchet is rotated through an angle of 90° from the position shown in Fig. 4, to the position shown in Figs. 5 and 6, and because ratchet 33 is connected to the stem 32 of valve 11, the valve is opened as shown in Fig. 6 to allow gas to flow from the supply pipe 12 to the burner 15 either directly or through the thermostat 13, if such thermostat is employed. The gas issuing from burner 15 will then be ignited by the flame of the pilot burner 17 and the cooking operation will begin. The pilot flame is not intense enough to perform any part of the cooking, baking and other process in the oven. When this automatic action has taken place, the handle 39 points upwardly and designates the word "on" inscribed on front plate 21, as shown in phantom in Fig. 2.

This cooking, baking or other action takes place for two hours until "off" pointer 63 reaches the point opposite the stationary index 67, when lug 80, corresponding to "off" pointer 63, engages pivoted pawl 56 to move it against the free end of pivoted lever 27, which in turn is moved thereby to withdraw its dog 31 out of contact with detent 45 and again release spring motor 47. The spring motor accordingly rotates cam 34, hook 44, connected ratchet 33 and valve stem 32 to turn off the gas then flowing to the burner 15. The cam 34 also releases pilot valve lever 82 and the spring of the pilot valve 85 shuts off the supply of gas and the flame of the pilot burner 17 is also extinguished or turned down to the normal small flame, depending upon the type of pilot employed. The elements constituting the device then lie in the positions shown in Figs. 2, 3, and 7, that is, with the valve 32 in closed position, the pointer of handle 39 designating "off" as shown in Fig. 2, and pointers 64 and 63 being in coincidence opposite the stationary index 67, which arrangement is not shown. The clock is again stopped by trigger 79, which operates the balance wheel brake or the like.

After the pilot flame has been extinguished or turned down, the bomb 18 is no longer heated, so that the gas therein again contracts, bellows 20 also contracts under the pressure of spring 22, and the detent 26 of corresponding lever 25 locks lever 27 against movement so that the gas cannot be turned on unless the pilot flame is burning. It will be seen that this provides an effective safety arrangement, when the pilot flame is extinguished or where the user forgets to light the pilot burner 17 when handle 39 has been turned to the "start" position shown in Fig. 2, whereby it was intended to prepare the apparatus for operation in the manner described. Under the latter circumstance, when pointer 64 moves to a position opposite stationary index 67 to turn on the gas in the usual way, the handle 39 is not stopped in the vertical or "on" position, but is carried around to the "off" position because safety detent 26 has locked lever 27 and thus prevented the movement of its dog 31 into the path of detent 45 so as to stop the latter, whereby the valve 11 would be normally opened in the manner described. It will be seen that in this event the valve 11 is only opened instantaneously while it is swung through the open position so that no gas can flow to the burner and cause a dangerous escape and accumulation. Thus, when the second pointer 63 moves opposite the stationary index 67, nothing will happen because the function of this pointer was to shut off the gas, but the gas had been already shut off because of failure of the pilot flame.

The mechanism may also be set to simply turn off the gas when the cooking, baking or other operation is to start at once. This is done by leaving "on" pointer 64 opposite the stationary index 67, setting the present time upon disc 65, turning "off" pointer 63 to the time graduation of dial 65 corresponding to the time that the gas is to be turned off, and turning handle 39 to the "on" position.

If the pilot burner is of the continually burning type and bomb 18 is continually heated thereby, the handle 39 will latch at once in the "on" position. If the pilot burner is of the continually burning type, but the bomb is arranged to be heated only when the pilot flame is lengthened by the action of cam 34, or if the arrangement requires that the pilot burner be lighted manually, the handle 39 must be held in the "on" position for a few minutes until bellows 20 expands and releases lever 27 so that its dog 31 catches and holds detent 45. In order to obviate this waiting, pointer 64 may be set a few minutes ahead of index 67 and handle 39 turned to the starting position, whereupon the gas will be turned on at the expiration of these few minutes in the usual way.

The pilot burner 17 and bomb 18 may also be so arranged that a small continuous flame maintains the bomb hot at all times, whereby bellows 20 is normally expanded to unlock the mechanism, but whenever the pilot flame is extinguished for any cause, the mechanism is locked in the manner described and remains locked until the pilot is relighted. With this arrangement, the cam surface 34 may be shortened so that the cam operates lever 82 to supply gas to pilot burner 17 momentarily for lengthening the flame thereof sufficiently to ignite the gas issuing from oven burner 15. Of course, if the pilot flame had been extinguished the lever 27 would be locked so that the dog 31 thereof would not stop detent 45 and the main valve 11 would immediately turn through the open position to the closed position and no gas would flow to the oven burner 15.

It will be seen that this invention provides a most effective and efficient apparatus for automatically turning on the gas at a predetermined future time and then automatically turning off the gas at another predetermined future time after a predetermined cooking interval has elapsed. All of this is done wholly automatically without the intervention of any human agency at any time beyond the original preparation of the apparatus any number of hours during the day in advance of the time desired for beginning the cooking operation. The action of the apparatus is positive and fool-proof, and is rugged and durable so as to remain operative for an indefinite period of time without any attention beyond occasional inspection. There is only one main valve to which the piping is connected, so that the piping operation is simple, the amount of piping small and inexpensive, and may be arranged to fit existing stoves of all types, whether or not the stoves are provided with a thermostatic regulator.

While the preferred embodiment of the invention has been shown and described in detail, it is to be understood that the invention is not limited to the embodiment shown, but is susceptible of extensive changes in form and detail within the scope thereof.

I claim:

1. In a fuel control device, the combination of a main burner, a pilot burner, a main valve controlling the supply of fuel to said main burner, a pilot valve controlling the supply of fuel to said pilot burner, mechanism for operating said main valve, and connections between said mechanism and said pilot valve for operating the latter.

2. In a fuel control device, the combination of a main burner, a pilot burner, a main valve controlling the supply of fuel to said main burner, a pilot valve controlling the supply of fuel to said pilot burner, mechanism for operating said main valve, apparatus controlling the operation of said mechanism to open and close said valve at predetermined times, and connections between said mechanism and said pilot valve to open and close the same upon operation of the mechanism.

3. In a fuel control device, the combination of a main burner, a pilot burner, a main valve controlling the supply of fuel to said main burner, a pilot valve controlling the supply of said pilot burner, mechanism for automatically and simultaneously operating said main and pilot valves, and a thermostatic device responsive to the heat of the pilot burner flame for controlling the operation of said mechanism.

4. In a fuel control device, the combination of a main burner, a pilot burner, a main valve controlling the supply of fuel to said main burner, a pilot valve controlling the supply of fuel to said pilot burner, mechanism for automatically and simultaneously operating said main and pilot valves, a clock, and escapement apparatus controlled by said clock and connected to said mechanism for releasing the same to operate said valves at predetermined times.

5. In a fuel control device, the combination of a main burner, a pilot burner, a main valve controlling the supply of fuel to said main burner, a pilot valve controlling the supply of fuel to said pilot burner, mechanism for automatically and simultaneously operating said main and pilot valves, apparatus for releasing said mechanism to operate said valves, and a member for setting said apparatus to release said mechanism under predetermined conditions.

6. In a fuel control device, the combination of a main burner, a pilot burner, a main valve for supplying fuel to said main burner, a pilot valve for supplying fuel to said pilot burner, a motor for opening and closing said main valve, means for preparing said motor for future operation, connections between said motor and said pilot valve for opening the same upon operation of said means, an escapement for releasing said motor to open said main valve, a second escapement for releasing said motor to simultaneously close said main and pilot valves, and time-controlled apparatus for releasing said escapements at predetermined times.

7. In a fuel control device, the combination of a main burner, a pilot burner, a main valve for supplying fuel to said main burner, a pilot valve for supplying fuel to said pilot burner, a motor for opening and closing said main valve, means for preparing said motor for future operation, connections between said motor and said pilot valve for opening the same upon operation of said means, an escapement for releasing said motor to open said main valve, a second escapement for releasing said motor to simultaneously close said main and pilot valves, time-controlled apparatus for releasing said escapements at predetermined times, and thermostatic means responsive to the heat of said pilot burner connectible to at least one of said escapements to lock the latter when the burner flame is extinguished and vice versa.

8. In a fuel control device, the combination of a burner, a normally closed valve for supplying fuel to this burner, means normally disconnected from the valve for operating the same, a motor for operating said valve, and manual means for connecting the valve operating means to said motor without disturbing said valve for operation thereof.

9. In a fuel control device, the combination of a fuel supply pipe, a valve therein, a motor adapted to actuate said valve, a pawl connected to said valve for holding it in closed position, a second pawl connected to said valve for holding it in open position, means for releasing said first pawl to permit the motor to open the valve, means for releasing said second pawl to permit the motor to close the valve, and thermoresponsive means controlling the operation of at least one of said means.

EDWARD L. FONSECA.